US012172536B2

(12) United States Patent
Nagel et al.

(10) Patent No.: US 12,172,536 B2
(45) Date of Patent: Dec. 24, 2024

(54) ELECTRIC VEHICLE WITH RESERVE POWER

(71) Applicant: Caterpillar Paving Products Inc., Brooklyn Park, MN (US)

(72) Inventors: Brian D. Nagel, Ramsey, MN (US); David Edwin Gerding, Maple Grove, MN (US); Tyler S. Burger, Plymouth, MN (US); Cary M Bryant, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 499 days.

(21) Appl. No.: 17/503,835

(22) Filed: Oct. 18, 2021

(65) Prior Publication Data

US 2023/0123720 A1    Apr. 20, 2023

(51) Int. Cl.
*B60L 15/20*    (2006.01)
*B60L 53/36*    (2019.01)
*B60S 5/06*    (2019.01)

(52) U.S. Cl.
CPC .............. *B60L 53/36* (2019.02); *B60S 5/06* (2013.01)

(58) Field of Classification Search
CPC .................................. B60L 53/36; B60S 5/06
See application file for complete search history.

(56) References Cited

U.S. PATENT DOCUMENTS

| 8,970,341 | B2 | 3/2015 | Park et al. |
| 10,183,563 | B2 | 1/2019 | Rayner et al. |
| 2013/0302089 | A1* | 11/2013 | Sina ........................ E02D 3/032 180/65.245 |
| 2019/0061544 | A1 | 2/2019 | Jansen et al. |
| 2019/0265057 | A1* | 8/2019 | Baglino ............ G01C 21/3469 |
| 2021/0107444 | A1* | 4/2021 | Blue .................. F16H 61/0213 |
| 2021/0309383 | A1* | 10/2021 | Clark .................. B64C 29/0033 |
| 2022/0072962 | A1* | 3/2022 | Maury ................. B60W 10/08 |
| 2022/0089055 | A1* | 3/2022 | TenHouten ......... H02J 7/00034 |
| 2023/0054361 | A1* | 2/2023 | Kirchhoff ............... B60L 15/20 |
| 2023/0303052 | A1* | 9/2023 | Gesang ................. B60W 10/02 |

FOREIGN PATENT DOCUMENTS

| CN | 101599554 | 1/2011 |
| DE | 102011118976 | 6/2012 |

* cited by examiner

*Primary Examiner* — Dalena Tran

(57) ABSTRACT

A work machine may include a source of electrical power, a ground engaging traction system, and an implement for performing work. The work machine may also include one or more motors operable to use the electrical power from the power source to operate the ground engaging traction system to cause the work machine to travel along the ground and operable to use the electrical power from the power source to operate the implement. The work machine may also include a reserve power component configured to receive a reserve power amount from a user or automatically determine the reserve power amount, compare an available power amount to the reserve power amount to establish a comparison, and issue alerts or impart controls on operation of the work machine based on the comparison.

14 Claims, 5 Drawing Sheets

ELECTRIC VEHICLE WITH RESERVE POWER

TECHNICAL FIELD

The present application relates generally to power control for vehicles. More particularly, the present application relates to systems and methods for determining, setting, adjusting, or otherwise controlling an amount of reserve power for a work machine such as a paver, cold planer, haul truck, excavator, or other electrical work machine. Still more particularly, the present application relates to systems for automatically controlling reserve power amounts based on a variety of changing factors.

BACKGROUND

Electric vehicles are commonly charged at a charging station. The charging stations may generally be stationary systems and, as such, electrical vehicles may be driven to the charging station and charged at the location of the charging station. In the case of electrically powered work machines, temporary or permanent charging stations may be present at or near project sites. In other cases, the electrically powered work machines may be carried on a trailer to charging stations. In either case, the electrically powered work machine may travel from a work site to the charging station or to a transport trailer when the work machine needs to be recharged. Operators may lose large amounts of time and money if the work machine runs out of stored energy before reaching the charging station or transport trailer. That is, transporting power packs, generators, or other power supplies large enough to recharge a stranded work machine may be costly and the downtime of the work machine may also result in operational losses. In the case of an asphalt paver, for example, additional losses associated with unusable asphalt in delivery trucks and other process interruptions may result in significant costs.

German Patent Application No.: 102011118976 relates to a motor vehicle, e.g., passenger car, that has an electrical connecting unit connected with a reserve battery for supplying electric power to an electrical driving apparatus, where the battery has a low battery capacity with respect to the vehicle battery. US Patent Application No. 20190061544 relates to a battery exchange system for battery-powered vehicles using an auxiliary battery.

SUMMARY

In one or more examples, a work machine may include a source of electrical power, a ground engaging traction system, and an implement for performing work. The work machine may also include one or more motors operable to use the electrical power from the power source to operate the ground engaging traction system to cause the work machine to travel along the ground and operable to use the electrical power from the power source to operate the implement. The work machine may also include a reserve power component configured to receive a reserve power amount from a user or automatically determine the reserve power amount, compare an available power amount to the reserve power amount to establish a comparison, and issue alerts or impart controls on operation of the work machine based on the comparison.

In one or more examples, a method of operating a work machine may include receiving a reserve power amount from a user or automatically determining a reserve power amount for the work machine. The method may also include monitoring an available amount of power and comparing the available amount of power to the reserve power amount. The method may also include providing alerts or imparting controls on the operation of the work machine based on the comparing.

DETAILED DESCRIPTION

Figure 1:
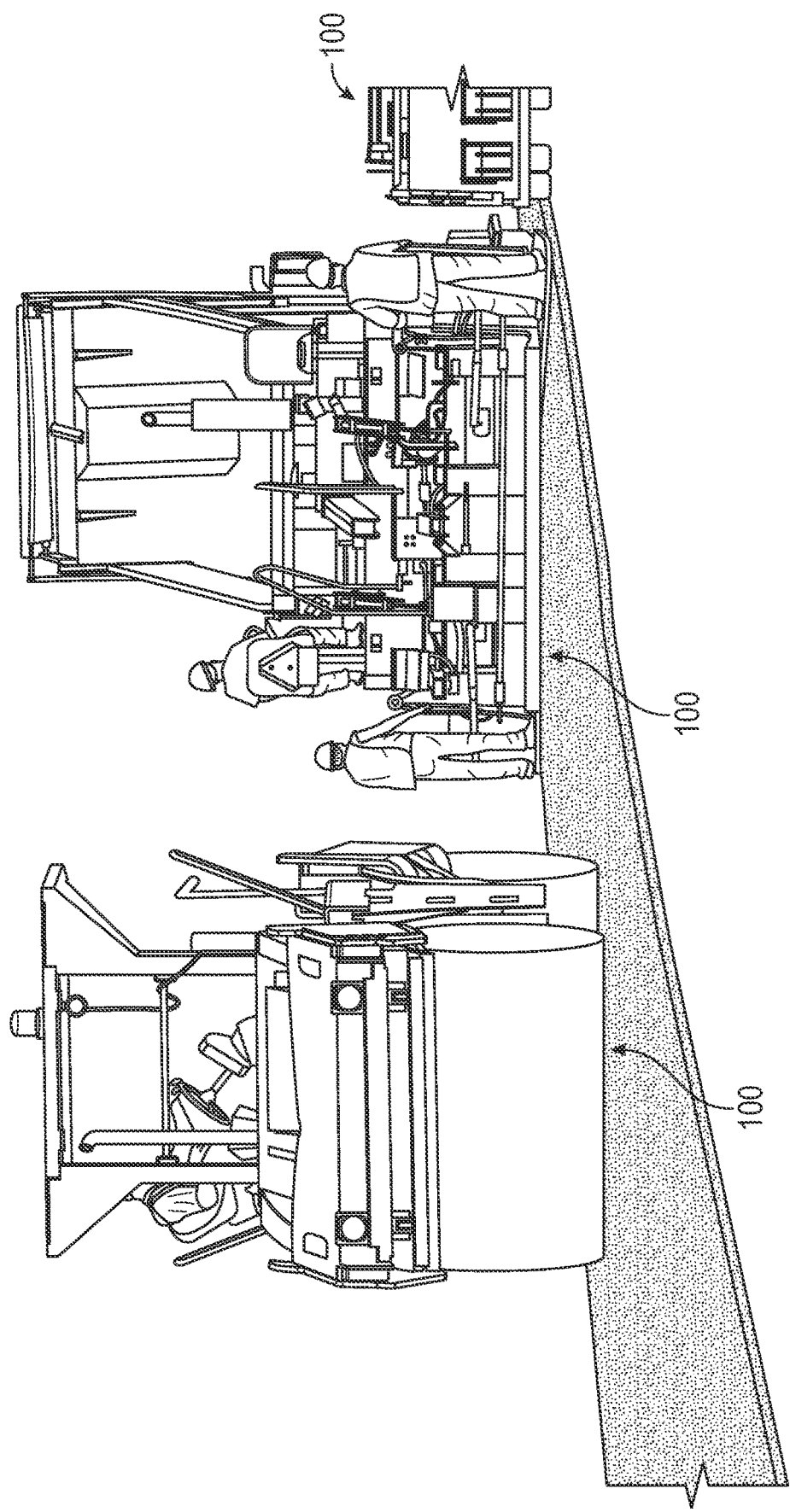
FIG. 1 is a perspective view showing several work machines working on a paving project, according to one or more examples.

FIG. 1 is a perspective showing several work machines 100 working on a paving project according to one or more examples. For example, an asphalt paver may be operating to receive loose asphalt from asphalt delivery trucks and place the asphalt in a substantially flat mat as it travels along the prepared base course. Vibratory rollers may be used to compact and/or compress the mat and create a smooth surface on the top of the mat. Other types of rollers and/or other work machines may be used during the process. The asphalt paver, the trucks, the rollers, and the other equipment may be electrically powered work machines and may include one or more electrical power sources such as batteries, for example. As discussed in more detail below, the work machines 100 may include a control system adapted to maintain a particular amount of reserve power unless or until it is appropriate to access the reserve power.

Figure 2:
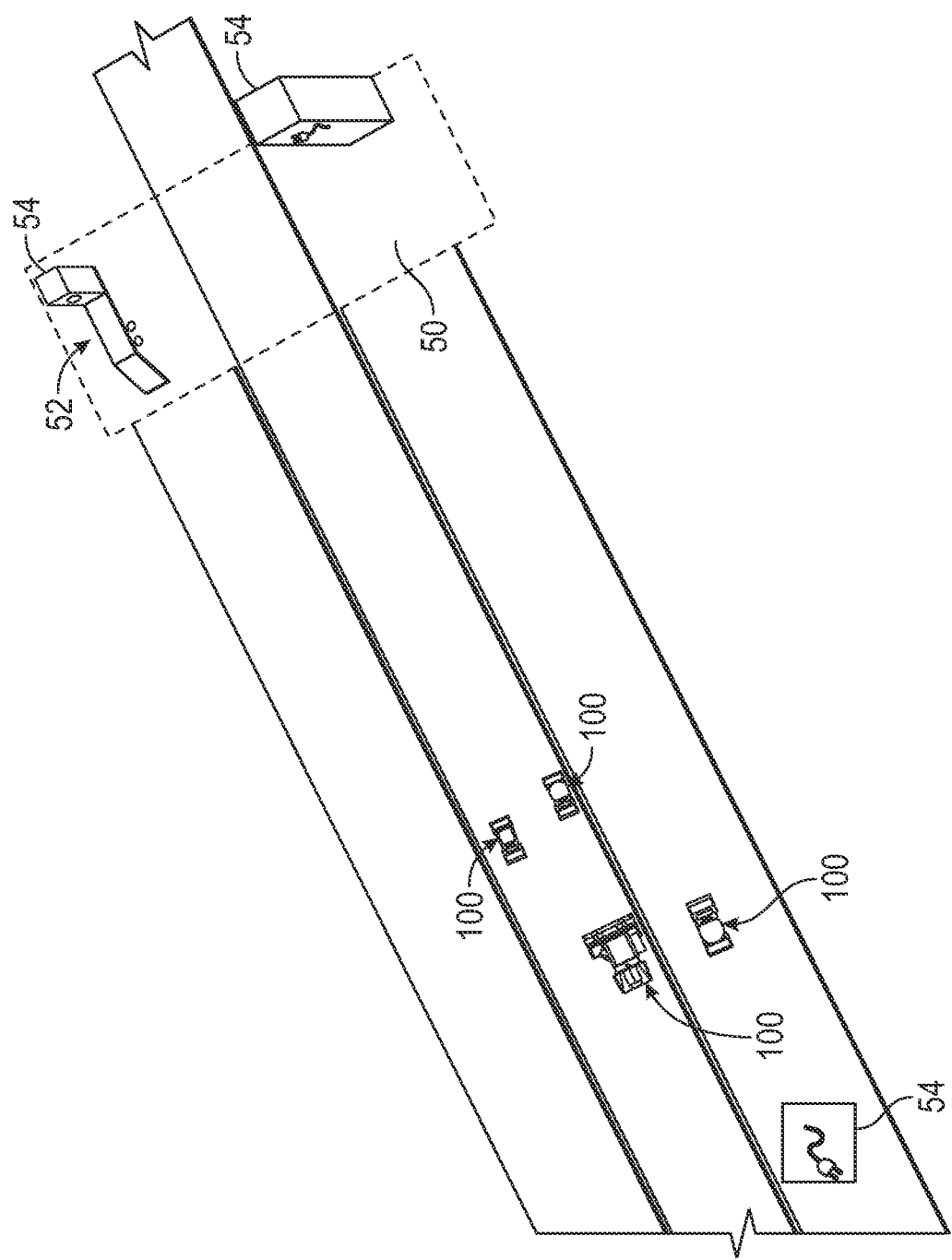
FIG. 2 is a plan view of a paving project showing relative locations of staging areas and work machines, according to one or more examples.

FIG. 2 is a top or plan view of an asphalt paving project having one or more electrically powered work machines 100 operating on the project. As shown, the work machines 100 may originate from a staging area 50 on a project where the work machines 100 may be offloaded from haul trailers 52 for example. Temporary or permanent charging stations 54 may be provided in the staging area 50 on a project or temporary or permanent charging stations 54 may be provided at one or more locations near or around the project. In some cases, no charging stations may be present in or throughout the project, but charging stations 54 may be provided on the haul trailers 52. In still other cases, no charging may be present at the project site or on the haul trailer and work machines 100 may be hauled on haul trailers to other locations for charging. The work machines 100 described herein may be configured to accommodate one or more of these conditions by reserving a particular amount of power unless or until it is appropriate to access the reserved power. For example, a sufficient amount of power may be reserved to make sure the work machine 100 can travel to a charging station 54, a haul trailer 52, or another oasis. One or more approaches to controlling the amount of reserve power may be provided.

Figure 3:
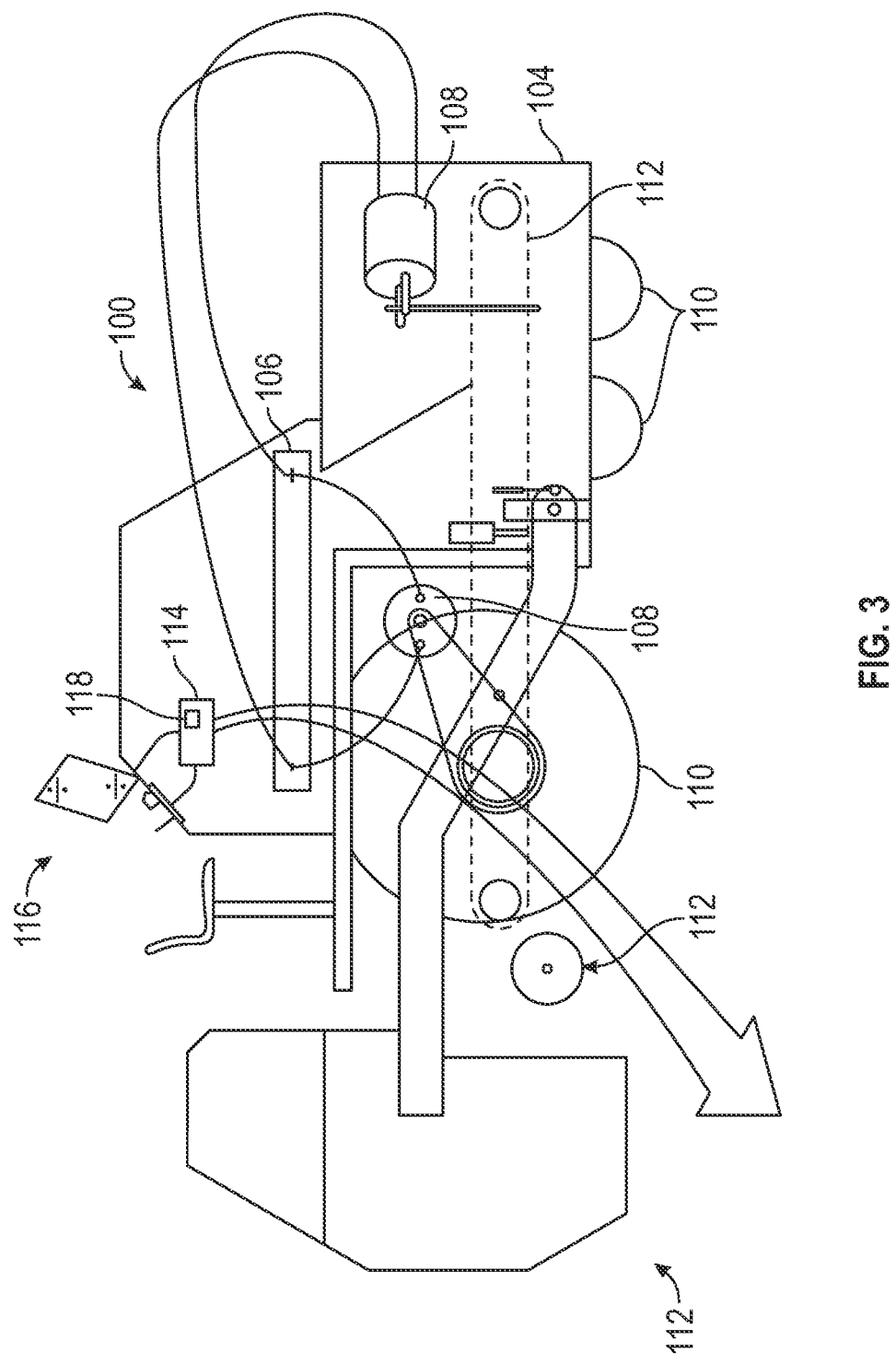
FIG. 3 is a perspective view of a work machine with a reserve power control system, according to one or more examples.

Turning now to FIG. 3, a work machine 100 is shown. The work machine 100 may be one of a variety of types of work machines 100. For example, and as shown, the work machine 100 may be in the form of an asphalt paver. In any case, the work machine 100 may be adapted for mobility and for performing work. For example, in the case of an asphalt paver, the work machine may be relatively central to the paving operation and may be configured for receiving loose asphalt from dump trucks, for delivering the asphalt to the ground in a controlled manner, and for providing power to move the tractor portion of the paver, the dump truck, and the screed portion of the paver along the ground surface at a controlled speed. In the case of a tandem vibratory roller, the work machine 100 may be adapted for placement on semi-compacted asphalt and for bringing the asphalt to a fully compacted state. The work machine 100 may operate to roll across the semi-compacted asphalt and induce vibration in the asphalt in addition to providing an external compressive load on the asphalt causing the asphalt to compact. Whether in the form of an asphalt paver, a tandem vibratory roller or another type of work machine 100, the work machine 100 may include a frame 104, a power source 106, a motor 108, a ground engaging traction system 110 operable by the motor via a control module, a work implement 112 operable by the motor (directly or indirectly).

The power source 106 may be arranged on the frame 104 and adapted to store energy and provide power to the work machine 100. In one or more embodiments, the power source may be in the form of a battery, a fuel tank, or another type of energy storing material. Depending on the nature of the power source, the power source may be in electrical and/or fluid communication with the motor 108.

The work machine motor 108 may be arranged on the frame and may be adapted to provide motive power to the work machine 100 by converting energy from the power source 106 to motion. In particular, the motor 108 may be an electric motor adapted to generate rotational power when placed in electrical communication with a battery. The motor may be mechanically coupled to the traction system 110 such that rotation of the motor provides rotational power to the traction system 110. The motor may also be mechanically coupled to one or more work implement 112 to deliver rotational power to the work implement 112. In the case of a paver, as shown, one motor may be adapted to deliver power to the traction system 110 and another motor may be adapted to deliver power to the hopper, the conveyor, and the auger portions of the implement 112.

The traction system 110 may be operable to translate the work machine across the ground or other supporting surface. That is, the traction system 110 may be in the form of wheels, rollers, tracks, or other system that, when rotated or provided with rotational power, cause the work machine to translate across the ground or supporting surface. It is to be appreciated that while rotational power has been described, skid feet or other types of traction system may be provided as well.

The work machine 100 may also include a work implement 112. In the case of an asphalt paver, the work implement may include a series of devices or system such as an operable hopper, a conveyor for pulling asphalt off a bottom of the hopper and conveying it rearward, and one or more augers for spreading the asphalt laterally in front of a trailing screed. Separate motors 108 may be provided to run the conveying systems or power takeoffs on the main motor may be provided. In the case of a tandem vibratory roller, the work implement 112 may be incorporated into the traction system 110 and may function to augment the traction system 110. That is, the tandem vibratory compactor may have particularly adapted rollers that not only allow for translation of the work machine 100, but also provide a vibratory and compaction effect on the supporting ground surface. Still other work implements 112 may be provided.

It is to be appreciated that while an asphalt paver is being used to describe the present reserve power concepts, other work machines 100 such as the referenced tandem vibratory roller, cold planers, excavator, front end loaders, and other types of work machines may be provided with a same or similar reserve power system described herein.

The work machine may be equipped with an operation controller 114 for controlling operation of the work machine 100. For example, in the case of an asphalt paver, the tractor (e.g., the working moving portion apart from the screed) may be equipped with a control system 114 such as an electronic control module (ECM) adapted to control the several features of the tractor (e.g., hopper, conveyor, auger, traction system, etc.) One or more user interfaces 116 may be provided allowing the operator to understand the operating conditions of the several features of the work machine 100 and to control those features. For example, the user interfaces may include one or more gauges or displays as well as one or more throttles, pedals, joysticks, steering wheels, slides, touch screens, or other types of user interfaces 116.

A reserve power component 118 may also be provided. The reserve power component 118 may be configured to reserve a particular amount of power unless or until it is appropriate to access the reserve power. That is, the reserve power component 118 may be a computing device particularly adapted to monitor an available amount of power at the power source 106, compare the available amount of power to one or more thresholds to establish a comparison which may be stored, and issue notifications or alerts as well as impart work machine limitations depending on the comparison. In one or more embodiments, the reserve power component 118 may include a computer readable storage medium or other non-transitory computer readable medium that has computer implementable instructions stored thereon that are operable by a processor. The reserve power component may be incorporated into the ECM of the work machine 100 as shown in FIG. 3 or a separate reserve power component 118 may be provided.

The reserve power component 118 may be configured for receiving, storing, and/or automatically determining a reserve power amount. That is, in one or more examples, the user interface may include a reserve power input allowing a user to input a reserve power amount. For example, in one or more examples, the input may allow the user, owner, or operator to select a particular percentage for reserve power such as 30%, 25%, 20%, 15%, 10%, 5%, 0%, or any other percentage of the overall fully charged available power. Particular integer values within or beyond the above range and fractional values within or beyond the above range may also be provided. The input amount may be an amount desirable or thought reasonable by the user, owner, or operator. In one or more examples, the user interface and underlying software may provide user accounts providing particular users with the ability to adjust the reserve power amount and not other users. This way, an authorized user such as an owner or manager of the work machine may be provided with the ability to set and/or adjust the reserve power amount, while unauthorized users or operators of the work machine might not be provided with such ability. In setting the reserve power amount, an authorized user may give consideration to the work environment of the work machine, the distances the work machine may travel from haul trailers or charging stations, the amount of power needed for travel as compared to performing work, whether work will be performed while travelling to a charging station, haul trailer or other oasis, or other factors.

While the reserve power amount has been described as being received from a user, the reserve power amount may additionally or alternatively be automatic. That is, the reserve power component 118 may be adapted to automatically determine a reserve power amount. In one or more examples, the reserve power component may determine the reserve power amount by identifying a distance to a charging station, haul trailer, or other oasis, and determining the amount of power that may be used to transport the work machine 100 over that distance. The reserve power component may determine the reserve power amount selectively, periodically, or continuously.

The identification of a distance to a charging station, haul trailer, or other oasis may be performed in a variety of ways. For example, in one or more examples, the distance identification may be provided by a global navigation satellite system (GNSS). The work machine 100 may be equipped with a GNSS receiver and may have access to mapping or other software allowing the work machine to recognize a machine position and one or more positions of available oases. The work machine may, thus, be able to determine a travel distance to one or more oases and, together with the power determination described below, may reserve power sufficient to travel the travel distance. In one or more embodiments, the travel distance may be a straight-line path to a selected oasis or a more controlled route. For example, depending on the nature of the work environment, the work machine may be able to travel over a generally straight-line path to one or more oases, or obstructions may be avoided, or preferred paths may be used. In one or more examples, the mapping or other software may include defined routes based on available roadways. In other examples, the user or operator may identify obstructions or preferred routes. For example, a setup interface may be provided where a user records a preferred path or several preferred paths while driving the equipment and recording the paths. In one or more other examples, the work machine may be equipped with sensors for identifying obstructions while working and may adjust available routes based on the identified obstructions. In one or more examples, the GNSS system may include a surrounding equipment status feature where the system gathers information about the status of one or more oases and identifies each of them as active or inactive, for example. That is, the surrounding equipment may communicate status information via Bluetooth, WiFi or other local area network, cellular data, the internet, or other wide area network. The work machine may review this status information allowing the work machine to include or exclude particular oases based on the status information. For example, where a charging station is out of order or where other factors prevent access or use of a charging station, the charging station may have an inactive status.

Figure 4:
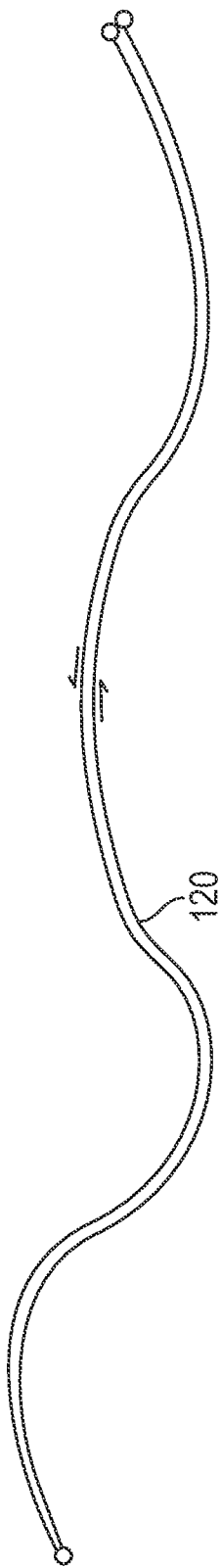
FIG. 4 is a diagram depicting an out and back pathway, according to one or more examples.
Figure 5:
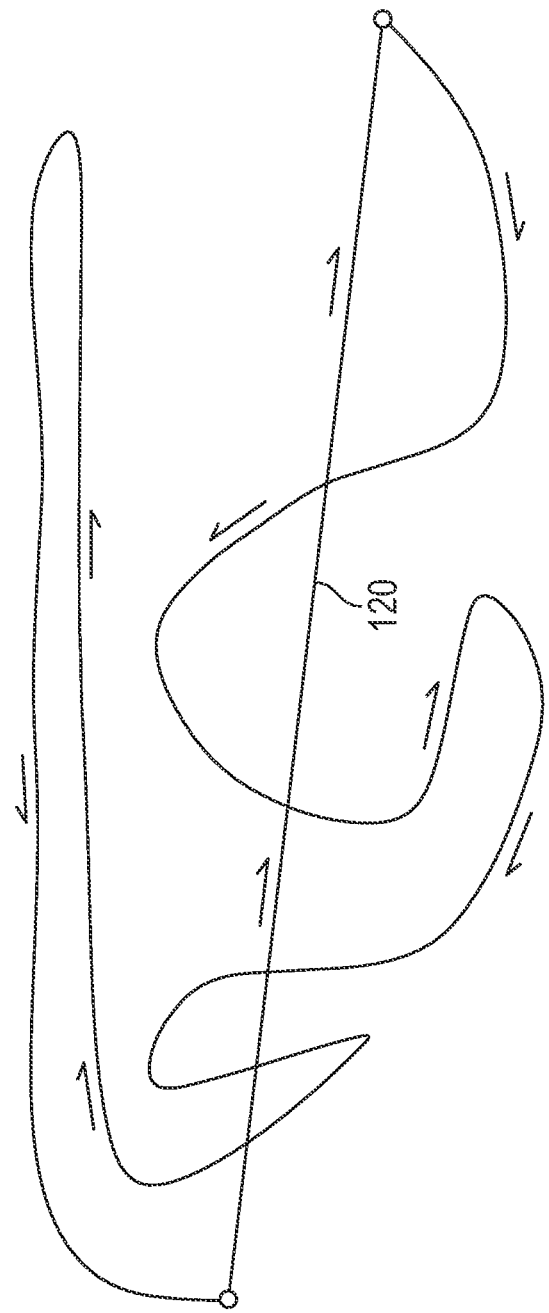
FIG. 5 is a diagram depicting a direct route pathway, according to one or more examples.
Figure 6:
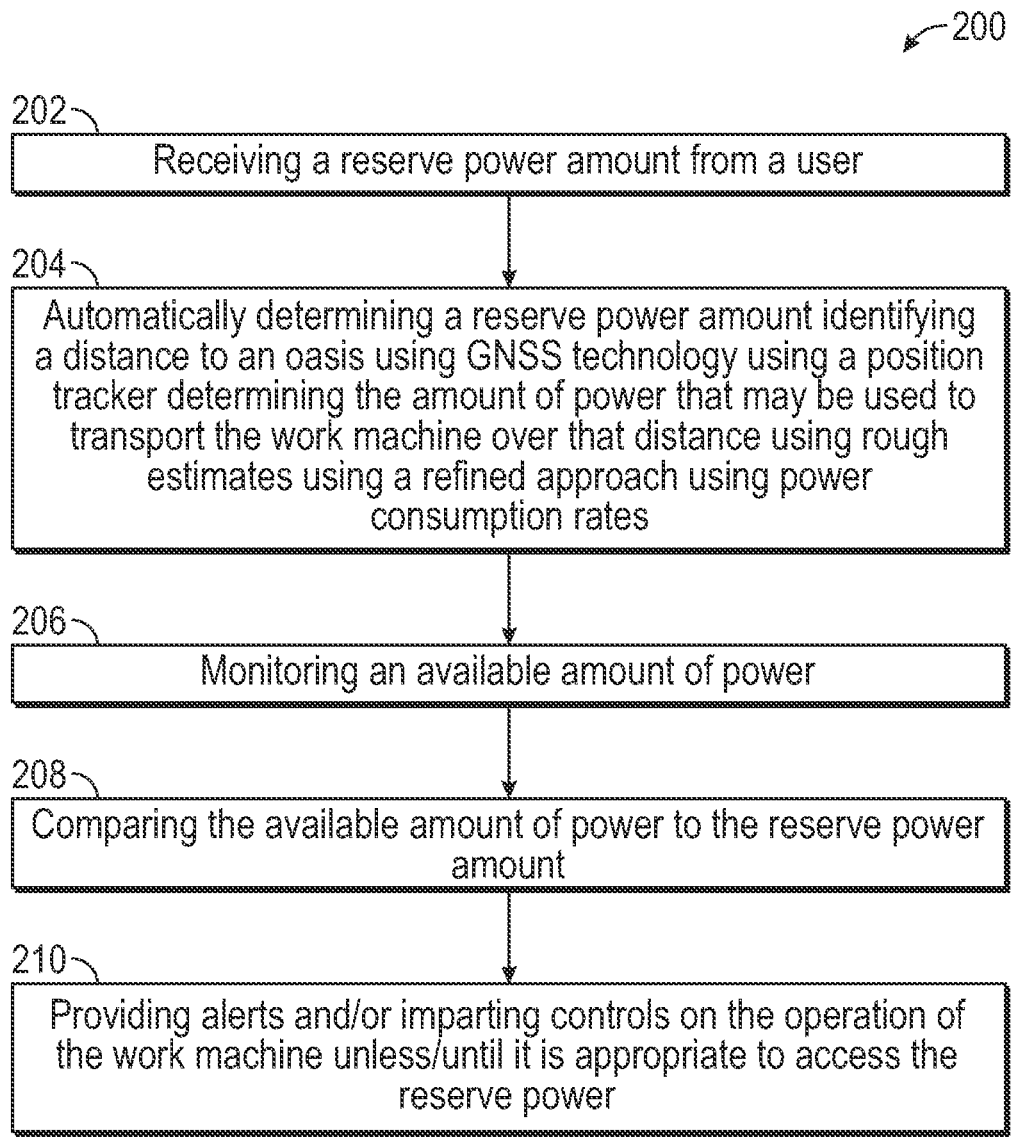
FIG. 6 is a diagram depicting a method of operation, according to one or more examples.

In one or more other examples, the distance identification may be performed by a position tracker system other than a GNSS. For example, the position tracker may track the direction and distance travelled by the machine 100 and may reserve sufficient power to allow the machine 100 to reach a charging station, haul trailer, or other oasis, sometimes at its original position. In this example, the work machine 100 may include a compass or other directional measuring system and an odometer, an encoder wheel, or other distance tracking device. Using the directional information and the distance measurements, the position tracker may track, monitor, and/or record a path of travel from an oasis such as a base location and, together with the power determination below, may reserve power sufficient to return to the base location or other oasis. As shown in FIG. 4, the path may be an out and back path where the return path 120 is assumed to be the same or similar to the map of travel. As shown in FIG. 5, the return path 120 may be a more direct route such as a straight-line return path to the base. In one or more embodiments, the straight-line return path may be adjusted to avoid obstructions or other obstacles and may be the straightest unobstructed path, for example. Still other return paths may be used.

In one or more embodiments, the base location or other oases locations may be automatic or provided by a user. For example, a sensor may be provided to indicate when a work machine leaves a haul trailer and may identify the haul trailer location as an oasis where the haul trailer is located. Alternatively or additionally, for example, a user interface may allow a user to pin a location to create a pin location that represents the base or other oasis. That is, for example, when a user removes a work machine from a haul trailer or otherwise leaves a base or staging area of equipment, the user may place a pin on a map of the work facility or jobsite. The work machine may, thus, base reserve power decisions on the pin location. That is, the work machine may use a GNSS or position tracking system to monitor the work machine distance from the pin location and reserve sufficient power to return to the pin location by way of an out and back, straight line, or adjusted straight line return path. In one or more examples, the user may provide one or more pin locations as charging locations or other suitable oases are encountered along the travel path. For example, if physical charging locations are encountered, the user may place a pin location as the charging location is passed while performing work or otherwise travelling. In other situations, a haul trailer may be moved to a new staging area and new or additional pin locations may be provided by the user based on the new location of the haul trailer. In one or more embodiments, the pin location may be the current location of the work machine when the user triggers the interface. However, in one or more examples, the pin location may be any location on a map, for example. That is, if a user knows of a charging station location, knows where the haul trailer is being moved to, or is aware of other oases, the user may select one or more of those locations as an oasis. The user may also cancel or unselect one or more oases. For example, where a haul trailer is moved and a pin location was set at the original location, the original pin location may be deleted or cancelled by the user or automatically by the haul trailer if the haul trailer is equipped to provide status information. As such, the reserve power component may have access to multiple potential oases for purposes of assessing, adjusting, or otherwise controlling the reserve power amount.

It is to be appreciated that while both GNSS and other position tracker systems have been described, either system or a combination of systems may be provided to identify one or more oases, identify a distance to the one or more oases, and select a particular oasis for purposes of reserving power based on a variety of factors. For example, while the position tracker system was described in the context of out and back pathways, where an oasis that is not at the original location is selected, the path may not be out and back. For example, the closest oasis may instead be selected by the reserve power component. Other factors may include accessibility or active/inactive status as mentioned. Still other factors for determining an oasis and corresponding distance for reserve power determination may be used.

Determining the amount of power that may be used to transport the work machine over the above identified distance may also be performed in a variety of ways. In one or more examples, relatively rough estimates of the amount of power that would be used to travel over the distance may be provided by the reserve power component. That is, the length of the distance may be compared to typical or common travel paths of the work machine. For example, a distance to an oasis may be approximately 25%, 30%, 40%, or 50% of a travel path for a typical workday and, as such, the reserve power may be 25%, 30%, 40%, or 50% as the case may be. In one or more examples, the rough estimate may be adjusted based on work being performed during return travel. For example, in the case of a paver, the return travel may be free of energy devoted or directed toward heating or running conveyors or augers and, as such, less power may be used during the return path. In other examples, a paver may pave one half of a roadway on an outgoing path and pave another half on a return and, as such, power reductions or savings during the return may be omitted. Similar situations may exist for cold planers, rotary mixers, and the like.

In one or more examples, the amount of power that would be used to travel the distance to an oasis may be slightly more refined. For example, the reserve power component 118 may monitor a power consumption rate during operations and rely on the consumption rate when determining the reserve power amount. For example, the travel distance to an oasis may be divided by the power consumption rate to arrive at a reserve power amount. Depending on the nature of the power consumption, the rate may be in power units per unit distance or power units per unit time. Where consumption rates are power units per unit time, the amount of time anticipated to travel the distance to the oasis may be incorporated into the calculation.

More particularly, in one or more examples, the reserve power component may monitor power usage by the work machine 100 collectively and/or may monitor power usage attributable to one or more operations of the work machine 100. That is, and again in the case of an asphalt paver, power consumption may result from heating the hopper, running the conveyors, and running the augers, as well as running the traction system that moves the paver along a path. In one or more embodiments, depending on the activities anticipated for the path to an oasis, the reserve power component may reserve sufficient power to perform particular operations during travel over the path and may monitor the consumption rate of those operations during working to determine the amount of power to reserve for navigating the path to the oasis. In one or more examples, the reserve power component may rely on average consumption rates or conservative or adjusted consumption rates. In still other examples, a buffer amount of power may be added to the reserve power calculated either with rough estimates or with the more refined approach.

The reserve power component 118 may operate to provide alerts and/or adjust, limit, or otherwise impart controls on the operation of the work machine 100 to reserve power unless/until it is appropriate to access the reserve power. For example, having calculated or otherwise determined a reserve power amount, the reserve power component may monitor the available power and compare the available power to a threshold such as the reserve power amount. In one or more examples, as the available power approaches the reserve power amount, the reserve power component may issue a series of warning or controls. For example, when the available power comes within a selected percentage of reserve power amount, the work machine may impart a first level of control and issue an alert in the form of a visual or auditory indication (e.g., light, flashing lights, alarm sound etc.) on the interface 116. That is, where full power capacity is 100% and the reserve power is determined to be 25%, the alert may occur when available power is within 10% of the reserve power and, as such, when available power is at 35%, an alert may be triggered.

When the available power gets closer to the calculated or determined reserve power, the reserve power component 118 may impart a second level of control and issue an additional alert in the form of a visual or auditory indication on the interface 116. This alert may differ from the first alert so the operator recognizes the escalated nature of the alert. That is, a visual indicator may be a different color, may flash, or flash more fervently, or an auditory indication may be louder, more abrasive, or other indications of heightened alert may be provided. This second level of control may also impart restrictions on operations of the equipment. For example, the reserve power component 118 may enforce a governor on the throttle causing the machine 100 to operate more slowly. In other examples, particular systems may be shut down. That is, for example, air conditioning in a cab of a work machine 100, or other accessories not deemed necessary for continued operation may be limited or shutdown. In other examples, operations more pertinent to the work machine tasks may be slowed or shut down completely. In one or more examples, the shutting down of particular operations may be based on a hierarchical decision matrix or sliding scale where less relevant operations are slowed or shut down and as the available power more closely approaches the reserve power, further operations may be slowed or shut down.

When the available power reaches the reserve power, the reserve power component 118 may impart a third level of control. For example, this may involve still further alerts that may have still further indications of further heighted alert by way of the interface 116. In addition, the reserve power component 118 may lock out all or most operations of the work machine 100 unless or until the operator overrides the control or begins travelling along the return or other path to an oasis. That is, for example, physical actuation of a reserve power access feature on the interface may be required on the user interface 116. This may be in the form of a touch screen button, a physical switch, dial, lever, or other physical control. In one or more examples, the reserve power component 118 may require input of a code or password, or a particular series of maneuvers with a joystick or a particular combination of actuation steps involving one or more interface features such as the gas pedal, brake, steering, and the like. Still other operator override schemes may be provided allowing for assurance that the user or operator has expressed a manifestation of assent to access the reserve power.

It is to be appreciated that the automatic nature of this may help to provide for situations where the reserve power amount is continually changing based on changing distances, changing available oases or oases locations, changing power consumption, etc. That is, where, for example, a user begins down a return path or other path toward an oasis before reaching reserve power amount, the system may naturally reduce the reserve power amount because of the increasing proximity to the base or other oasis. Moreover, where additional oases are added or where a particular oasis becomes closer to the work machine 100, a preference for such oasis may cause a reduction in the reserve power amount. Still other ever-changing aspects of the machine operation and the environment around the machine 100 may allow for very precise determinations of reserve power and avoiding undue limitations on machine performance and/or the machine's ability to complete tasks.

INDUSTRIAL APPLICABILITY

In operation and use, a work machine 100 and/or controller on a work machine 100 may perform a method of operation 200 involving reservation of power. The method 200 may include receiving 202 or automatically determining 204 a reserve power amount. The method may also include monitoring an available amount of power 206 and comparing the available amount of power to a reserve power amount 208. The method may also include providing alerts and/or imparting controls 210 on the operation of the work machine 100 unless/until it is appropriate to access the reserve power. Receiving a reserve power amount may occur by way of receiving an input from a user and storing the input as a reserve power amount. Moreover, automatically determining a reserve power amount may include identifying a distance to an oasis and determining the amount of power that may be used to transport the work machine over that distance. Identifying a distance to an oasis may be performed using GNSS technology or a position tracker may be used. User input may also be relied on for identifying work machine and/or oasis locations. Determining the amount of power that may be used to transport the work machine over the return path distance may be based on rough estimates or a more refined approach involving power consumption rates may be used.

The above detailed description is intended to be illustrative, and not restrictive. The scope of the disclosure should, therefore, be determined with references to the appended claims, along with the full scope of equivalents to which such claims are entitled.

What is claimed is:

1. A work machine, comprising:
   a source of electrical power;
   a ground engaging traction system;
   an implement for performing work;
   one or more motors operable to use the electrical power from the power source to operate the ground engaging traction system to cause the work machine to travel along the ground and operable to use the electrical power from the power source to operate the implement; and
   a reserve power component configured to:
   automatically determine the reserve power amount based on a distance to an oasis and a power consumption rate captured during operations;
   compare an available power amount to the reserve power amount to establish a comparison; and
   issue alerts or impart controls on operation of the work machine based on the comparison,
   wherein the distance to an oasis is selected from a plurality of distances to a plurality of respective oases and the reserve power amount is continually determined based on the plurality of distances and the power consumption rate.

2. The work machine of claim 1, wherein the reserve power component comprises a user interface to receive the reserve power amount.

3. The work machine of claim 2, wherein the user interface is adapted to distinguish authorized users from unauthorized users.

4. The work machine of claim 1, wherein the distance is determined based on a GNSS.

5. The work machine of claim 4, wherein the GNSS includes status information about the plurality of oases.

6. The work machine of claim 1, wherein the distance is determined from a position tracker.

7. The work machine of claim 1, wherein a location of the plurality of oases is a pinned location that is automatically determined.

8. The work machine of claim 1, wherein a location of the plurality of oases is a pinned location provided by the user.

9. The work machine of claim 1, wherein the power consumption rate comprises a rate of power consumption to operate the ground engaging traction system.

10. The work machine of claim 1, wherein the power consumption rate comprises a rate of power consumption to operate the ground engaging traction system and the implement.

11. The work machine of claim 1, wherein the reserve power component is configured to impart controls by restricting performance of the ground engaging traction device or the implement.

12. The work machine of claim 11, wherein restricting performance comprises restricting operating speed.

13. The work machine of claim 1, wherein the reserve power component is configured to impart controls by locking out operation of the ground engaging traction system.

14. A method of operating a work machine, comprising:
   automatically determining a reserve power amount for the work machine based on a distance to an oasis and a power consumption rate captured during operations;
   monitoring an available amount of power,
   comparing the available amount of power to the reserve power amount; and
   providing alerts or imparting controls on the operation of the work machine based on the comparing:
   wherein the distance to an oasis is selected from a plurality of distances to a plurality of respective oases and the reserve power amount is continually determined based on the plurality of distances and the power consumption rate.

* * * * *